US007906078B2

(12) United States Patent
Seki

(10) Patent No.: US 7,906,078 B2
(45) **Date of Patent: *Mar. 15, 2011**

(54) ADSORBENT OF LATENT-HEAT STORAGE TYPE FOR CANISTER AND PROCESS FOR PRODUCING THE SAME

(75) Inventor: Kenji Seki, Higashiosaka (JP)

(73) Assignee: Osaka Gas Co., Ltd., Osaka-Shi (JP)

( * ) Notice: Subject to any disclaimer, the term of this patent is extended or adjusted under 35 U.S.C. 154(b) by 1210 days.

This patent is subject to a terminal disclaimer.

(21) Appl. No.: 10/516,941

(22) PCT Filed: Jun. 6, 2003

(86) PCT No.: PCT/JP03/07177

§ 371 (c)(1),
(2), (4) Date: Dec. 15, 2004

(87) PCT Pub. No.: WO03/106833

PCT Pub. Date: Dec. 24, 2003

(65) Prior Publication Data

US 2005/0247202 A1 Nov. 10, 2005

(30) Foreign Application Priority Data

Jun. 18, 2002 (JP) ................................ 2002-176650
Aug. 20, 2002 (JP) ................................ 2002-238797

(51) Int. Cl.
*C01B 31/08* (2006.01)

(52) U.S. Cl. ...................................... 422/177; 502/416

(58) Field of Classification Search .................. 422/177; 502/416

See application file for complete search history.

(56) References Cited

U.S. PATENT DOCUMENTS

| | | | |
|---|---|---|---|
| 4,869,739 A | 9/1989 | Kanome et al. | |
| 4,971,605 A | 11/1990 | Tarman | 55/25 |
| 5,418,203 A | 5/1995 | Ichikawa et al. | |
| 5,506,293 A * | 4/1996 | Steelman et al. | 524/496 |
| 5,861,050 A | 1/1999 | Pittel et al. | 95/115 |
| 6,599,856 B1 | 7/2003 | Uchino et al. | 502/180 |
| 6,673,328 B1 * | 1/2004 | Klett et al. | 423/445 R |
| 6,780,505 B1 * | 8/2004 | Klett et al. | 428/367 |
| 7,309,381 B2 * | 12/2007 | Yamazaki et al. | 95/153 |

FOREIGN PATENT DOCUMENTS

| | | |
|---|---|---|
| JP | 62-38468 | 3/1987 |
| JP | 63-57351 | 4/1988 |
| JP | 1988-57351 | 4/1988 |
| JP | 57351/1988 | 4/1988 |
| JP | 64-036962 | 2/1989 |
| JP | 5-7488 | 2/1993 |
| JP | 06-010781 | 1/1994 |
| JP | 8-4605 | 1/1996 |
| JP | 09-183605 * | 7/1997 |
| JP | 09-221665 | 8/1997 |
| JP | 10-339218 | 12/1998 |
| JP | 11-35931 | 2/1999 |
| JP | 11-207149 | 3/1999 |
| JP | 2001-145832 | 5/2001 |
| JP | 2001-240407 | 9/2001 |
| JP | 2001-322872 | 11/2001 |
| JP | 2002-45385 | 2/2002 |

OTHER PUBLICATIONS

International Search Report dated Sep. 24, 2003.
Japanese Office Action dated Mar. 26, 2008.
Korean Office Action dated Sep. 27, 2006.
Chinese Office Action dated Jul. 6, 2007 and English translation.
"Activated Carbon Canisters for Automobiles", Filtration & Separation, Dec. 1997, pp. 1016-1018.
Japanese Office Action mailed Jan. 13, 2010.
Supplementary European Search Report dated Jun. 7, 2010.

* cited by examiner

*Primary Examiner* — Stuart Hendrickson
(74) *Attorney, Agent, or Firm* — Kratz, Quintos & Hanson, LLP

(57) ABSTRACT

The present invention provides a latent-heat storage type adsorbent composition for canisters that can effectively prevent changing in temperature due to the heat of absorption/desorption and has a high butane working capacity; a process for producing the adsorbent; and a canister employing the latent-heat storage type adsorbent composition for canisters. The present invention relates to a latent-heat storage type adsorbent composition for canisters which compromises an adsorbent adsorbing a fuel vapor and a heat-storage material comprising microencapsulated phase-changing material which absorbs or releases latent heat in response to temperature change, and a method for producing such an adsorbent.

14 Claims, No Drawings

ADSORBENT OF LATENT-HEAT STORAGE TYPE FOR CANISTER AND PROCESS FOR PRODUCING THE SAME

TECHNICAL FIELD

The present invention relates to a canister, i.e., an apparatus for preventing vehicle fuel from vaporizing, and an adsorbent composition used therein.

BACKGROUND ART

As an anti-pollution measure, the fuel vapor that is generated in an automobile's fuel storage chambers, such as the fuel tank, the float chamber of the carburetor, etc., is usually guided to a carbon canister during stops and while traveling and adsorbed by activated carbon, which serves as an adsorbent. While traveling, air is brought into the canister to desorb the adsorbed fuel, and the desorbed fuel is fed into an inlet pipe of the engine through a control valve.

Generally, the lower is the temperature of the activated carbon, the greater is the fuel vapor adsorption capacity of the activated carbon. Conversely, the higher is the temperature of the activated carbon, the greater is its desorption capacity. However, because the reaction in which fuel vapor is adsorbed by activated carbon is an exothermic reaction with the result that the temperature of the activated carbon rises as fuel vapor is adsorbed, the adsorption capacity of the activated carbon is invariably decreased. In contrast, because the reaction in which the fuel vapor is desorbed from the activated carbon is an endothermic reaction with the result that the temperature of the activated carbon is lowered as fuel vapor is desorbed, the desorption capacity of the activated carbon is also decreased.

To solve the above problem, a canister is proposed in which a granular material having a specific heat greater than that of activated carbon is mixed with the activated carbon. In this canister, the increase in the temperature of the activated carbon caused by the heat generated by the fuel vapor adsorption from the activated carbon is attenuated by the presence of a material having a greater specific heat; conversely, the heat stored in the material having a greater specific heat is utilized to supply the heat that is required for desorbing the fuel vapor from the activated carbon, to prevent the decrease in the temperature of the activated carbon. Thus, the adsorption/desorption characteristics are improved.

However, materials having a high specific heat composed of metals, ceramics, etc., whose specific heat is low relative to the absorption/desorption heat, must be used in a large amount in combination with the activated carbon to obtain a satisfactory effect. Combined use of activated carbon with these materials having little adsorption capacity will not greatly improve the adsorption capacity as a whole, even if the temperature aspect is improved.

DISCLOSURE OF THE INVENTION

To solve or alleviate the above problems, an object of the present invention is to provide a latent-heat storage type adsorbent composition for canisters that can effectively prevent changes in temperature due to absorption/desorption heat and has a high butane working capacity; a process for producing such an adsorbent composition; and a canister employing the latent-heat storage type adsorbent composition.

The present inventors conducted an extensive research and found that the above object can be achieved by an adsorbent composition for canisters that includes an adsorbent capable of adsorbing fuel vapors and a powdery heat-storage material comprising a microencapsulated phase-change material, wherein the phase-change material absorbs or releases latent heat in response to temperature change. The present invention is accomplished based on these novel findings.

In more detail, the present invention provides the following latent-heat storage type adsorbent composition for canisters, a method for producing the same, and a canister for preventing the vaporization of fuel.

1. A latent-heat storage type adsorbent composition for canisters comprising an adsorbent and a heat-storage material;

the adsorbent being capable of adsorbing fuel vapor, the heat-storage material comprising a microencapsulated phase-change material, the phase-change material absorbing or releasing latent heat in response to temperature change.

2. A latent-heat storage type adsorbent composition for canisters according to Item 1, wherein the adsorbent is activated carbon, activated alumina or a mixture thereof.

3. A latent-heat storage type adsorbent composition for canisters according to Item 1 or 2, wherein the average particle diameter of the heat-storage material is about 1/1000 to about 1/10 of that of the adsorbent.

4. A latent-heat storage type adsorbent composition for canisters according to Item 1, 2 or 3, wherein the average particle diameter of the adsorbent is about 1 μm to about 10 mm.

5. A latent-heat storage type adsorbent composition for canisters according to any one of Items 1 to 4, wherein the average particle diameter of the heat-storage material is about 0.1 to about 500 μm.

6. A latent-heat storage type adsorbent composition for canisters according to any one of Items 1 to 5, wherein the heat-storage material is adhered to and/or deposited on the surface of the adsorbent.

7. A latent-heat storage type adsorbent composition for canisters which is in a form of a molded article comprising a latent-heat storage type adsorbent composition for canisters according to any one of Items 1 to 6 and a binder.

8. A latent-heat storage type adsorbent composition for canisters according to Item 7, wherein the molded article is in at least one shape selected from the group consisting of pellet, disc and block.

9. A method for producing a latent-heat storage type adsorbent composition for canisters according to any one of Items 1 to 6 wherein the heat-storage material is adhered to and/or deposited on the surface of the adsorbent.

10. A method for producing a latent-heat storage type adsorbent composition for canisters according to any one of Items 1 to 6 wherein the heat-storage material is electrostatically adhered to and/or deposited on the surface of the adsorbent.

11. A method for producing a latent-heat storage type adsorbent composition for canisters according to any one of Items 1 to 6 wherein the heat-storage material and the adsorbent are uniformly mixed.

12. A method for producing a latent-heat storage type adsorbent composition for canisters according to any one of Items 1 to 6 wherein a slurry obtained by suspending the heat-storage material in a liquid medium is mixed with the adsorbent, and the mixture is then dried.

13. A method for producing a latent-heat storage type adsorbent composition for canisters comprising:

suspending a heat-storage material containing a microencapsulated phase-change material in a liquid medium to give a slurry, the phase-change material capable of absorbing or releasing latent heat in response to temperature change, and spraying a liquid mixture containing the slurry and, if necessary, a binder, on the surface of the fuel vapor adsorbent.

14. A method for producing a latent-heat storage type adsorbent composition for canisters comprising:

molding a heat-storage material containing a microencapsulated phase-change material capable of absorbing or releasing latent heat in response to temperature change to produce a molded article, and uniformly mixing a fuel vapor adsorbent and the molded article.

15. A method for producing a latent-heat storage type adsorbent composition for canisters comprising:

uniformly mixing a fuel vapor adsorbent, a powdery heat storage material containing a microencapsulated phase-change material capable of absorbing or releasing latent heat in response to temperature change or a slurry suspending the powdery heat storage material in the liquid medium, a binder and water, and molding the resultant mixture to form a desired shape.

16. A latent-heat storage type adsorbent composition for canisters obtained by the method according to any one of Items 13 to 15.

17. A canister for preventing fuel vaporization in which the latent-heat storage type adsorbent composition of any one of Items 1 to 8 and 16 is placed in a canister case.

DETAILED DESCRIPTION OF THE INVENTION

Hereinafter, the present invention is described in detail.

Latent-heat Storage Type Adsorbent Composition for Canisters

The latent-heat storage type adsorbent composition for canisters of the present invention can be obtained by mixing an adsorbent capable of adsorbing fuel vapor (hereinafter sometimes referred to as simply an "adsorbent") and a powdery heat-storage material comprising a microencapsulated material that absorbs or releases latent heat in response to temperature change and undergoes phase changes (Hereinafter referred to as a "phase-change material"). More precisely, the latent-heat storage type adsorbent composition for canisters of the invention has a feature that a heat-storage material comprising a phase-change material is used for controlling the heat generated in the adsorbent for use in a canister.

The latent-heat storage type adsorbent composition for canisters is applied to fuel vapors such as automobile gasoline vapor, etc.

The adsorbent for adsorbing fuel vapor used in the invention may be an adsorbent used in known canisters; examples include activated carbon, activated alumina, silica gel, zeolites, organometallic complexes, silica porous bodies, etc., and mixtures thereof. Activated carbon, activated alumina and mixtures thereof are preferable. Activated carbon is particularly preferable. Activated carbon can be those obtained from various materials such as coal, coconut shell, wood, lignin, etc.; these materials can be converted into activated carbon by water vapor; carbon dioxide; phosphoric acid, zinc chloride, alkali metals or like industrial chemicals.

The adsorbents used in the invention are preferably in the form of granules or powder having micro pores to increase the capacity for adsorbing fuel vapor. The average particle diameter of the adsorbent is usually in the range of about 1 μm to about 10 mm. The specific surface area thereof is usually about 500 to about 2500 $m^2/g$ and preferably about 800 $m^2/g$ to about 2300 $m^2/g$. The diameter of the micro pore is usually about 10 Å to about 50 Å and preferably about 10 Å to about 35 Å.

The heat-storage material used in the invention comprises microcapsule powder in which a phase-change material is encapsulated.

There is no limitation to the phase-change material that is encapsulated in the heat-storage material as long as it can adsorb and release latent heat with a change from one phase to another. The phase change can be a change between a solid phase and a liquid phase, etc. The temperature at which the phase-change material starts to undergo a phase change (e.g., melting point, solidifying point, etc.) can be suitably adjusted depending on the usage of the canister, and is generally about 0° C. to about 50° C. Preferable examples of phase change compounds are tetradecane, pentadecane, hexadecane, heptadecane, octadecane, nonadecane, eicosane, docosane and like straight-chain aliphatic hydrocarbons; natural waxes; petroleum waxes; $LiNO_3.3H_2O$, $Na_2SO_4.10H_2O$, $Na_2HPO_4.12H_2O$ and like hydrates of inorganic compounds; capric acid, lauric acid and like fatty acids; $C_{12-15}$ higher alcohols; methyl palmitate, methyl stearate and like esters, etc. To control the melting point of the phase-change material, a combination of two or more compounds selected from the above may be used. When two or more phase-change materials are used in combination, it is preferable that the difference in the temperature at which the selected phase-change materials undergo phase change is in the range of about 0° C. to about 15° C.

To prevent supercooling in the phase-change material, a compound having a melting point higher than that of the phase-change material may be added. Examples of such high melting point compounds are aliphatic hydrocarbons, aromatic compounds, esters, carboxylic acids, alcohols, amides, etc. These high melting point compounds may be used singly or in combination of two or more. Mixtures such as castor oil, etc., are also usable.

Examples of aromatic compounds include halogen-substituted benzenes, naphthalene, etc. Examples of halogen-substituted benzenes include dibromobenzene, dichlorobenzene and like dihalogenated benzenes.

Examples of esters include fatty acid esters of monoalcohols such as methyl eicosanoate; fatty acid esters of glycerol such as glycerides of linoleic acid, etc.

Examples of carboxylic acids include myristic acid, pentadecylic acid, palmitic acid, margaric acid, stearic acid, nonadecanoic acid, eicosanoic acid, henicosanoic acid, behenic acid and like aliphatic carboxylic acids; benzoic acid and like aromatic carboxylic acids, etc.

Examples of alcohols include cetyl alcohol, heptadecanol, stearyl alcohol, nonadecanol, eicosanol and like monoalcohols.

Examples of amides include eicosanamide, nonadecanamide, stearamide, oleamide and like fatty acid amides.

The concentration of additive high melting point compound is usually about 0.5 wt % to about 30 wt % and preferably about 1 wt % to about 15 wt %, relative to the phase-change material.

Known materials can be used as materials for the microencapsulating phase-change material, such as polymer compounds such as resins. Examples of polymer compounds include formaldehyde/melamine resins, melamine resins, formaldehyde/urea resins, urea resins, urea/formaldehyde/polyacrylic acid copolymers, polystyrene, polyvinyl acetate, polyacrylonitrile, polyethylene, polybutyl methacrylate, gelatin, etc.

The weight ratio of the microcapsule material to the phase-change material is not limited and usually in the range of about 30:70 to 10:90. When a high melting point compound and a phase-change material are used in combination, the weight ratio of the microcapsule material to the total amount of high melting point compound and phase-change material can be set in the above range.

The phase-change material used in the invention can be microencapsulated by a known method, such as coacervation methods, interfacial polymerization methods, in-situ methods, methods using yeast, etc. The effects of the invention can be attained by any of the known methods.

For example, it is possible to prepare a dispersion (slurry) of microcapsules having resin walls and the phase-change material (and, if necessary, a high melting point compound) enclosed therein, by emulsifying a phase-change material (and, if necessary, a high melting point compound) in a liquid medium using an emulsifier or the like, adding an initial condensate (prepolymer) corresponding to the desired resin, raising the temperature of the mixture to finish the polymerization reaction.

As a liquid medium, water is particularly preferable, and water miscible solvent, such as methanol, ethanol, propanol and like alcohols, acetone, etc., may also be used. It is also possible to use a mixture of the above-mentioned solvents.

The microcapsules are generally spherical particles; and the conditions suitable for controlling the diameter of the particles are variable depending on the kind and concentration of the emulsifier used for the encapsulation, the temperature and duration of emulsification, the method for emulsification, etc., and therefore the most preferable conditions can be suitably determined by experimentation. The average particle diameter of the microcapsule is usually about 1/1000 to about 1/10 of that of the adsorbent, in consideration of the contact area over the microcapsules with the adsorbent. Specifically, it is usually in the range of about 0.1 μm to about 500 μm and preferably about 0.5 μm to about 500 μm.

The latent-heat storage type adsorbent composition for canisters of the invention is a mixture in which an adsorbent and a heat-storage material comprising a microencapsulated phase-change material are distributed uniformly, and the heat-storage material is adhered to the surface of the adsorbent particles.

Method for Producing a Latent-Heat Storage Type Adsorbent Composition for Canisters The latent-heat storage type adsorbent composition for canisters of the present invention can be produced, for example, by the following manner. The objective powdery composition can be obtained by uniformly mixing an adsorbent with a dispersion (slurry) of microcapsules comprising a phase-change material, wherein the dispersion (slurry) is obtained by the above-mentioned method, etc., and then drying the resulting mixture.

Alternatively, it is possible to obtain the objective powdery composition by uniformly mixing an adsorbent with a microcapsule powder (heat-storage material) obtained by drying a dispersion (slurry) of microcapsules.

The mixing method mentioned above can be selected from the known methods, such as placing the heat-storage material (or slurry) and the adsorbent in a predetermined case or bag and shaking the mixture; methods using a mixer, kneader and other stirrers; methods using a rotary mixer, etc. The drying method can also be selected from among known methods.

The latent-heat storage type adsorbent composition for canisters of the invention preferably has high heat transfer efficiency, because a heat-storage material having a diameter smaller than that of an adsorbent is adhered to the surface of the adsorbent particles, and the heat-storage material and the adsorbent can contact each other. For example, by controlling the average particle diameters of the heat-storage material and the adsorbent in the manner described above, the heat-storage material can electrostatically adhere to or deposit on the surface of the adsorbent merely by uniformly mixing the heat-storage material with the adsorbent, and therefore the latent-heat storage type absorbent composition for canister has high packing density and high heat transfer efficiency. Furthermore, because separation of the heat-storage material and the adsorbent can be lessened, it is possible to prevent changes in temperature during adsorption and desorption cycles for a long time.

To prevent the adsorbent from being released from the canister into the engine, the powdery latent-heat storage type adsorbent composition for canisters of the invention can be formed into molded articles. Molding can be conducted by a known method, such as mixing a powdery heat-storage material with adsorbent and compression molding the mixture, etc.

If necessary, the latent-heat storage type adsorbent composition for canisters can be molded with a binder. The molded articles can be obtained by, for example, uniformly mixing a heat-storage material, adsorbent, and binder in the liquid medium, adhering and/or depositing the heat-storage material on the surface of the adsorbent, and then molding the mixture. Usable binders are not limited, and examples thereof are generally used ones such as methylcellulose, carboxymethylcellulose and like celluloses; phenol resins; polyvinyl alcohol; vinyl acetate, etc. Examples of shapes of the molded articles include pellets, discs, blocks, etc.

Example of a production method other than that exemplified above is as follows: The latent-heat storage type adsorbent composition of the invention wherein the microcapsules coat the surface of the adsorbent can be obtained by spraying a mixture of a dispersion containing a microencapsulated phase-change material (a slurry suspending the heat-storage material in a liquid medium) and, if necessary, a binder, onto the surface of the adsorbent having the shape of a pellet, pulverized powder, etc., and drying the sprayed adsorbent. Examples of binders are methylcellulose, carboxymethylcellulose and like celluloses; phenol resins; polyvinyl alcohol; vinyl acetate and like known binders. Known methods can be employed for mixing, spraying and drying.

Alternatively, it is possible to obtain the latent-heat storage type adsorbent composition of the invention by uniformly mixing adsorbent having the shape of pellets or a pulverized powder with microcapsules (heat-storage material) molded in a certain shape such as cylindrical pellets, spherical pellets, sheets, etc. A known method can be employed to form the microcapsules (heat-storage material), and, if necessary, a binder may be added when molding the heat-storage material. The above-mentioned known binders can be used as binder.

Alternatively, it is possible to obtain the latent-heat storage type adsorbent composition of the invention by uniformly mixing adsorbent powder, a powder or other form of heat-storage material or a microcapsule dispersion liquid containing a phase-change material (a slurry suspending the heat-storage material in a liquid medium), a binder, and water; and molding the mixture. The above-mentioned known binders can be used and a known molding method can be employed.

The ratio of the heat-storage material to the adsorbent contained in the latent-heat storage type adsorbent composition of the invention can be suitably selected by a person skilled in the art depending on the properties thereof. The content of the heat-storage material is usually about 10 to about 100 parts by weight based on 100 parts by weight of the adsorbent. When a binder is used, the content of the binder is generally about 1 to about 10 parts by weight based on 100 parts by weight of the adsorbent.

The adsorbent composition of the invention placed in a canister case can adsorb fuel vapor gas by introducing the fuel vapor gas from a fuel tank into the case. The temperature of the gas and the case is preferably not higher than the temperature at which the phase-change material undergoes a phase change (usually the melting point).

BEST MODE FOR CARRYING OUT THE INVENTION

Hereinafter, the present invention is explained in great detail with reference to Examples and Comparative Examples. Note that the present invention is not limited to or by these Examples.

Example 1

To 5 g of melamine powder, were added 6.5 g of 37% aqueous formaldehyde solution and 10 g of water, the pH of the mixture was adjusted to pH 8, and the temperature was raised to about 70° C., giving an aqueous solution of melamine/formaldehyde initial condensate. Separately, a solution of 70 g of n-octadecane as a phase-change compound was added to 100 g of an aqueous solution of a styrene anhydride copolymer sodium salt adjusted to pH 4.5 while intensely stirring, and emulsification was conducted until the particle diameter became about 10 μm. Encapsulation was conducted by adding the total amount of the above aqueous solution of melamine/formaldehyde initial condensate to the thus obtained emulsified solution, stirring at 70° C. for two hours, and adjusting to pH 9.

After completion of the reaction, the capsules were filtered out by suction and dried, giving capsules having a particle diameter of about 15 μm. These capsules were uniformly mixed with pulverized activated carbon having a particle diameter of 0.2 mm to 3 mm in such a manner that the proportion of the capsules relative to the activated carbon was 15 wt %, and the resulting mixture was then dried, obtaining the objective heat-storage type adsorbent composition wherein the microcapsules were dispersed over the surface of the activated carbon.

The activated carbon used was 0.50 mm to 2.36 mm pulverized coal activated carbon having a specific surface area of 1250 $m^2$/g, a pore capacity of 0.71 ml/g, and an average pore diameter of 12 Å.

Example 2

The butane working capacity of the heat-storage type adsorbent composition obtained in Example 1 was measured by the following method. The above heat-storage type adsorbent composition was placed in a one-liter metal canister, 99% n-butane was adsorbed by downflowing it to the canister at one l/min at 25° C., and supply of the butane was stopped when the concentration of the butane at the outlet reached 5000 ppm. Air was then let into the canister at room temperature at 15 l/min for 20 minutes by upflowing it to the canister to desorb the n-butane. Such absorption and desorption operations were repeated. The butane working capacity was determined based on the mean values of the amounts of the $4^{th}$, $5^{th}$ and $6^{th}$ absorption and desorption cycles.

As a result, the butane working capacity was found to be 46.7 g/l for a one-liter canister case.

Comparative Example 1

The butane working capacity of activated carbon used in Example 1 only was measured in the same manner as in Example 2, and found to be 41.6 g/l for a one-liter canister case.

As is clear from the above result, the butane working capacity is improved by adding a heat-storage material.

A heat-storage type adsorbent composition was prepared in the same manner as in Example 1, except using eicosane instead of the n-octadecane used as a phase-change material in Example 1. Using the resulting heat-storage type adsorbent composition, the butane working capacity was measured in the same manner as in Example 2. The result showed an improved butane working capacity over that of Comparative Example 1.

A heat-storage type adsorbent composition was prepared in the same manner as in Example 1, except using caprylic acid instead of the n-octadecane in Example 1. Using the resulting heat-storage type adsorbent composition, the butane working capacity was measured in the same manner as in Example 2. The result showed an improved butane working capacity over that of Comparative Example 1.

A heat-storage type adsorbent composition was prepared in the same manner as in Example 1, except using methyl palmitate instead of the n-octadecane in Example 1. Using the resulting heat-storage type adsorbent composition, the butane working capacity was measured in the same manner as in Example 2. The result showed an improved butane working capacity over that of Comparative Example 1.

Example 3

To 5 g of melamine power, were added 6.5 g of 37% aqueous formaldehyde solution and 10 g of water, the pH of the mixture was adjusted to pH 8, and the temperature was raised to about 70° C., giving an aqueous solution of melamine/formaldehyde initial condensate. Separately, a solution of 70 g of n-octadecane as a phase-change compound and 1.4 g of castor oil as an anti-supercooling agent was added to 100 g of a solution of a styrene anhydride copolymer sodium salt adjusted to pH 4.5 while intensely stirring, and emulsification was conducted until the particle diameter became about 10 μm. Encapsulation was conducted by adding the total amount of the above aqueous solution of melamine/formaldehyde initial condensate to the thus obtained emulsified solution, stirring at 70° C. for two hours, and adjusting the pH to pH 9.

After completion of the reaction, the capsules were filtered out by suction and dried, giving capsules having a particle diameter of about 15 μm. 25 parts by weight of these capsules and 5 parts by weight of binder (carboxymethylcellulose) were dispersed in a small amount of water, 100 parts by weight of pulverized activated carbon having a particle diameter of 1 mm to 3 mm was added to the obtained dispersion. The resulting mixture was uniformly mixed, and then dried at 90° C., obtaining the objective heat-storage type adsorbent composition wherein the microcapsules were adhered to the surface of the activated carbon.

The activated carbon used was 1 mm to 3 mm pulverized coal activated carbon having a specific surface area of 1500 $m^2$/g, a pore capacity of 0.96 ml/g, and an average pore diameter of 13 Å.

Example 4

The butane working capacity of the heat-storage type adsorbent composition obtained in Example 3 was measured by the following method. The above heat-storage type adsorbent composition was placed in a one-liter metal canister, 99% n-butane was adsorbed by downflowing it to the canister at one l/min at 25° C., and supply of the butane was stopped when the concentration of the butane at the outlet reached 5000 ppm. Air was then let into the canister at room temperature at 15 l/min for 20 minutes by upflowing it to the canister to desorb the n-butane. Such absorption and desorption operations were repeated. The butane working capacity was determined based on the mean values of the amounts of the $4^{th}$, $5^{th}$ and $6^{th}$ absorption and desorption cycles.

As a result, the butane working capacity was found to be 62.5 g/l for a one-liter canister case. The maximum temperature while adsorbing was 57° C. in the center of the case, the minimum temperature while desorbing was 18° C. in the center of the case.

The heel amount (the amount of butane left in pores after desorption) after the $6^{th}$ desorption was 30.8 g/l.

Comparative Example 2

The butane working capacity of the activated carbon used in Example 3 only was measured in the same manner as in Example 4, and found to be 56.3 g/l for a one-liter canister case. The maximum temperature while adsorbing was 73° C. in the center of the case, the minimum temperature while desorbing was 14° C. in the center of the case.

The heel amount (amount of butane left in pores after desorption) after the $6^{th}$ desorption was 48.2 g/l.

As is clear from the above results, the adsorbent composition comprises heat-storage material containing a phase-change material, a canister comprising the composition can improve the butane working capacity, reduce the temperature rise ratio during absorption, and enhance the desorption ability (reduction of heel amount), and thereby the emission amount of vapor gas can be reduced.

Effect of the Invention

When a canister containing the latent-heat storage type adsorbent composition of the present invention is used, the adsorption heat generated when fuel vapor is adsorbed by an adsorbent is transferred to a heat-storage material containing a phase-change material, and stored as latent heat in the heat-storage material. Therefore, the ratio of temperature rise in the adsorbent is lessened and the capability for adsorbing fuel vapor is significantly improved.

When the fuel vapor is desorbed from an adsorbent, the heat stored in the heat-storage material is transferred to the adsorbent, and therefore reduction of the temperature of the adsorbent is lessened. This further improves the fuel vapor desorption ability.

Therefore, the latent-heat storage type adsorbent composition for canisters of the invention exhibits a significantly improved ability for adsorbing and desorbing fuel vapor compared to conventional adsorbents for canisters and adsorbents for canisters containing a high specific heat.

Furthermore, because the temperature rise of a canister caused by the heat generated during adsorption is reduced, inexpensive materials having a lower heat resistance can be used for a canister case. This makes it possible to provide a miniaturized canister at low cost.

The invention claimed is:

1. A canister for preventing vehicle fuel vaporization, comprising:

a case containing a latent-heat storage type adsorbent composition, the latent-heat storage type adsorbent composition comprising an adsorbent and a heat-storage material;

the adsorbent being in the form of granules or powder having pores, and being capable of adsorbing vehicle fuel vapor, the heat-storage material comprising a microencapsulated phase-change material, the phase-change material absorbing or releasing latent heat in response to temperature change, wherein the average particle diameter of the heat-storage material is about 1/1000 to about 1/10 of that of the adsorbent, the average particle diameter of the adsorbent is about 1 μm to about 10 mm, the average particle diameter of the heat-storage material is about 0.1 to about 500 μm, the specific surface area of the adsorbent is about 500 to about 2500 $m^2/g$, the diameter of the pores of the adsorbent is about 10 Å to about 50 Å, and the content of the heat-storage material is about 10 to about 100 parts by weight based on 100 parts by weight of the adsorbent, wherein the heat-storage material is adhered to and/or deposited on the surface of the adsorbent.

2. A canister for preventing vehicle fuel vaporization according to claim 1, wherein the adsorbent is activated carbon, activated alumina or a mixture thereof.

3. A canister for preventing vehicle fuel vaporization according to claim 1, wherein the latent-heat storage type adsorbent composition is in a form of a molded article comprising the composition and a binder.

4. A canister for preventing vehicle fuel vaporization according to claim 3, wherein the molded article is in at least one shape selected from the group consisting of pellet, disc and block.

5. The canister for preventing vehicle fuel vaporization according to claim 1, wherein the heat-storage material is electrostatically adhered to and/or deposited on the surface of the adsorbent.

6. The canister for preventing vehicle fuel vaporization according to claim 1, wherein the heat-storage material is adhered to and/or deposited on the surface of the adsorbent uniformly mixing the heat-storage material with the adsorbent.

7. The canister for preventing vehicle fuel vaporization according to claim 1, wherein the heat-storage material is adhered to and/or deposited on the surface of the adsorbent by obtaining a slurry by suspending the heat-storage material in a liquid medium and mixing with the adsorbent, and then drying the slurry.

8. A canister for preventing vehicle fuel vaporization according to claim 1, wherein the latent-heat storage type adsorbent composition for canisters is obtained by a method comprising:

suspending the heat-storage material in a liquid medium to give a slurry, and spraying a liquid mixture containing the slurry and, if necessary, a binder, on the surface of the vehicle fuel vapor adsorbent.

9. A canister for preventing vehicle fuel vaporization according to claim 1, wherein the latent-heat storage type adsorbent composition for canisters is obtained by a method comprising:

molding a heat-storage material to produce a molded article, and uniformly mixing the adsorbent and the molded article.

10. A canister for preventing vehicle fuel vaporization according to claim 1, wherein the latent-heat storage type adsorbent composition for canisters is obtained by a method comprising:

uniformly mixing a vehicle fuel vapor adsorbent, the heat storage material, the heat storage material being a powder or a slurry suspending the powdery heat storage material in the liquid medium, a binder and water, and molding the resultant mixture to form a desired shape.

11. A canister for preventing vehicle fuel vaporization, comprising:

a case containing a latent-heat storage type adsorbent composition, the latent-heat storage adsorbent composition comprising an absorbent and a heat-storage material;

the adsorbent being in the form of granules, powder or pellets having pores, and being capable of adsorbing vehicle fuel vapor, the heat-storage material comprising a microencapsulated phase-change material, the phase-change material absorbing or releasing latent heat in response to temperature change, wherein the average particle diameter of the heat-storage material is about 1/1000 to about 1/10 of that of the adsorbent, the average particle diameter of the adsorbent is about 1 μm to about 10 mm, the average particle diameter of the heat-storage material is about 0.1 to about 500 μm, the specific surface area of the adsorbent is about 500 to about 2500 $m^2/g$, the diameter of the pores of the adsorbent is about 10 Å to about 50 Å, and the content of the heat-storage material is about 10 to about 100 parts by weight based on 100 parts by weight of the adsorbent, wherein the latent-heat storage type adsorbent composition for canisters is obtained by a method comprising:

molding a heat-storage material to produce a molded article, and uniformly mixing the adsorbent and the molded article.

12. A canister for preventing vehicle fuel vaporization according to claim 11, wherein the adsorbent is activated carbon, activated alumina or a mixture thereof.

13. A canister for preventing vehicle fuel vaporization according to claim 11, wherein the latent-heat storage type adsorbent composition is in the form of a molded article comprising the composition and a binder.

14. A canister for preventing vehicle fuel vaporization according to claim 11, wherein the molded article is in at least one shape selected from the group consisting of pellet, disc and block.

* * * * *